(No Model.)  5 Sheets—Sheet 1.

T. E. JEFFERSON.
Sulky Plow.

No. 243,676.  Patented June 28, 1881.

Fig. 1

Attest:
W. H. H. Knight
Wm. A. Blackstock

Inventor:
Thomas E. Jefferson,
By Hill & Church,
His attys.

(No Model.)  5 Sheets—Sheet 2.

T. E. JEFFERSON.
Sulky Plow.

No. 243,676.   Patented June 28, 1881.

Attest,
W. H. Knight
Wm. A. Blackstock

Inventor,
Thomas E. Jefferson
By Hill & Church
His attys.

N. PETERS, Photo-Lithographer, Washington, D. C.

(No Model.) 5 Sheets—Sheet 3.

T. E. JEFFERSON.
Sulky Plow.

No. 243,676. Patented June 28, 1881.

Attest,
W. H. H. Knight
Wm. A. Blackstock.

Inventor,
Thomas E. Jefferson
By Hill & Church
His Attys (No Model.) 5 Sheets—Sheet 4.

T. E. JEFFERSON.
Sulky Plow.

No. 243,676. Patented June 28, 1881.

Attest,
W. H. H. Wright
Wm. A. Blackstock

Inventor,
Thomas E. Jefferson
By Hire & Church
His Attys

UNITED STATES PATENT OFFICE.

THOMAS E. JEFFERSON, OF BOSTON, MASSACHUSETTS.

SULKY-PLOW.

SPECIFICATION forming part of Letters Patent No. 243,676, dated June 28, 1881.

Application filed May 21, 1881. (No model.)

*To all whom it may concern:*

Be it known that I, THOMAS E. JEFFERSON, of Boston, in the county of Suffolk and State of Massachusetts, have invented certain new and useful Improvements in Sulky-Plows; and I do hereby declare the following to be a full, clear, and exact description of the same, reference being had to the accompanying drawings, forming part of this specification, in which—

This invention relates chiefly to improvements in that class of plows known as "sulky" or "wheel" plows, though in some particulars it is also applicable to other styles of plows.

The invention consists, primarily, in the novel construction of the main frame of the machine.

It further consists in the manner of mounting the main frame upon its supporting-wheels and axles.

It further consists in the peculiar manner of hanging the plow and connecting it to the frame by chains or their equivalents, whereby the proper position of the plow in the ground is automatically preserved.

It further consists in a novel combination of parts whereby, when the plow meets an obstruction, its point is caused to rise and its rear portion to descend so as to clear the same.

It further consists in a novel combination of parts whereby the plow is enabled to pass around an obstacle without throwing the main frame and wheels out of their course, and to be brought back again automatically into normal position.

It further consists in novel mechanism for raising the plow out of the ground by the draft or power of the team.

It further consists in the combination, with the main frame and the supporting-wheels thereof, one of which has a peripheral flange, of the plow suspended from the main frame and a series of obliquely-arranged rotary disks for further dividing or harrowing the turned soil, and also, in connection with the flanged supporting-wheel, for resisting the side pressure of the plow.

It further consists in arranging the said oblique disks substantially abreast the mold-board, so as to exert a directly opposite resistance to the side pressure on the plow.

It further consists in arranging such disks so that they will yield to obstructions and regain their former positions after passing the same.

It further consists in a novel combination of devices which permit of adjustment of the said disks in and out of the soil by the driver from his seat.

It further consists in the employment of one or more open revolving disks at the rear of the mold-board of the plow for the purpose of automatically pulverizing and inverting the soil.

It further consists in certain other novel combinations of parts, which will be hereinafter fully described and claimed.

In the drawings, A represents the main frame of the machine, B B' the supporting-wheels, and C C' the axles upon which the supporting-wheels are mounted. The main frame has an extension, $a\,a$, a shorter extension, $a^2\,a^2$, united to the first by a part, $a'$, and also two front projecting arms or bars, $a^3\,a^3$, for the attachment of the tongue of the machine. The entire frame may be cast or otherwise formed in one piece of metal, or it may be constructed in several parts bolted together, as preferred. It is made as light as is consistent with the proper degree of strength.

The wheel B is fixed rigidly to the revolving axle C, and the latter extends through and has its bearings in both vertical parts of the extension $a\ a$, and an end bearing in the inner vertical part of the extension $a^2\ a^2$, as shown. Wheel B', on the other hand, is loosely mounted upon the short axle C', which is firmly secured to the outer part of the extension $a^2\ a^2$.

In the upper part of the frame-extension $a\ a$ is mounted a cross-shaft, D, from which the plow E is designed to be suspended by any suitable flexible connection which will permit of the free vertical movement of the plow, and also of a slight lateral play of it. I prefer, however, to employ the connection shown in the drawings as best adapted for the purpose. It consists of a short curved arm, $d$, secured centrally to the shaft D, and having side flanges, $d'\ d'$, a link, $e$, articulated to the flanges $d'\ d'$ near the upper ends thereof, and adapted to fit between said flanges, and a second link, $f$, articulated to the link $e$, and also to the beam of the plow, as shown. On the inner projecting end of the shaft D is rigidly secured a pulley, $g$, over which passes a chain, $h$, that also passes around a pulley, $i$, mounted loosely on the revolving axle C. The hub of the pulley $i$, on one side of the pulley, is provided with a radially-projecting stud, $i'$, having an inclined face, and adapted to engage with a stop, $a^4$, on the inner part, $a$, of the frame when the pulley is rotated, while said hub, on the other side of the pulley, is provided with clutch-teeth $i^2$, which are adapted to engage with corresponding clutch-teeth, $i^3$, on a ring, $i^4$, secured to a disk, $i^5$, fixed rigidly to and revolving with the axle C. A shipping-lever, K, pivoted at $k$, and within reach of the driver from his seat J, is adapted to engage with the loose pulley $i$ and slide it longitudinally along the axle into engagement with the constantly-revolving clutch-ring $i^4$, so as to cause the pulley $i$ to be rotated and in turn impart motion to the chain $h$ and pulley $g$, secured to shaft D, and cause the latter shaft to raise the plow from the ground by means of the flexible connection.

Figures 6, 7, 8, 9, 10, 11, 12, 13, 14, 15:
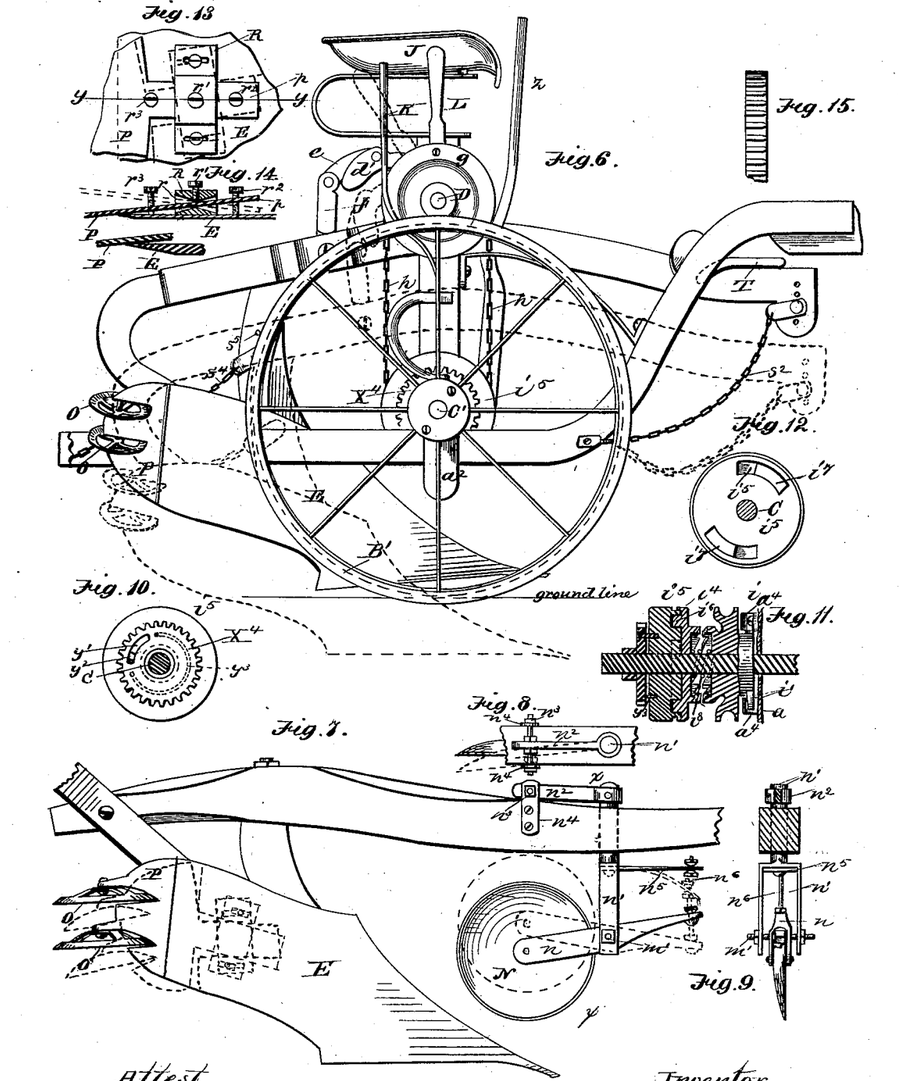
Fig. 6, a side view of the machine, with the raking-frame and the seed and fertilizer sowing mechanisms omitted.
Fig. 7 is a view of the plow, showing particularly the construction of the colter and of the harrowing and pulverizing disks at the rear of the mold-board.
Fig. 8 is a top view of the colter.
Fig. 9, a rear view of the same, partly in section.
Fig. 10, a view of the gear-wheel which drives the seed and fertilizer sowing mechanisms.
Fig. 11 is a sectional view of the clutch arrangement on the revolving axle.
Fig. 12 is a view of the fixed disk of the clutch.
Figs. 13 and 14 are views showing the means for giving the various adjustments to disks at the rear of the mold board.
Fig. 15 is a view illustrating the beveled-edged teeth of the gears of the seed and fertilizer sowing mechanisms.

To prevent shock and injury to the parts by the sudden engagement of the clutch-teeth, the clutch-ring $i^4$ is provided with inwardly-projecting lateral studs or rings $i^6$, which extend into recesses in the fixed part $i^5$ in front of elastic india-rubber blocks or pieces $i^7$, held within said part $i^5$, as shown in Fig. 11. When the clutch-teeth are first engaged the rubber pieces yield slightly, and thus relieve the parts from that shock and strain which would attend a positive unyielding engagement. A spiral spring, $i^8$, coiled about the axle C, operates to keep the clutch-teeth of the two parts normally disengaged.

L is a lever having an eye at one end, which fits upon the hub of the pulley $g$, and is held thereon loosely by means of a pin passing through said hub. This lever has a lateral pin, $l$, which enters a recess in the side of the pulley $g$, and is kept normally pressed outward by the action of a small spring arranged within the said recess and bearing against the end of the said pin.

M is a plate having an inclined edge, $m$, which operates to move the outwardly-pressed lever inward, and having also a shoulder, $m'$, behind which the lever automatically locks when raised to a substantially vertical position. At the time when the lever locks behind the shoulder $m'$, or immediately thereafter, the inclined face of the radially-projecting stud $i'$ strikes the stop $a^4$ on the frame and causes the pulley $i$ to be moved longitudinally until its clutch-teeth are disengaged from the clutch-teeth of the revolving clutch-ring $i^4$, thus effecting an automatic disconnection of the parts.

Figure 1:
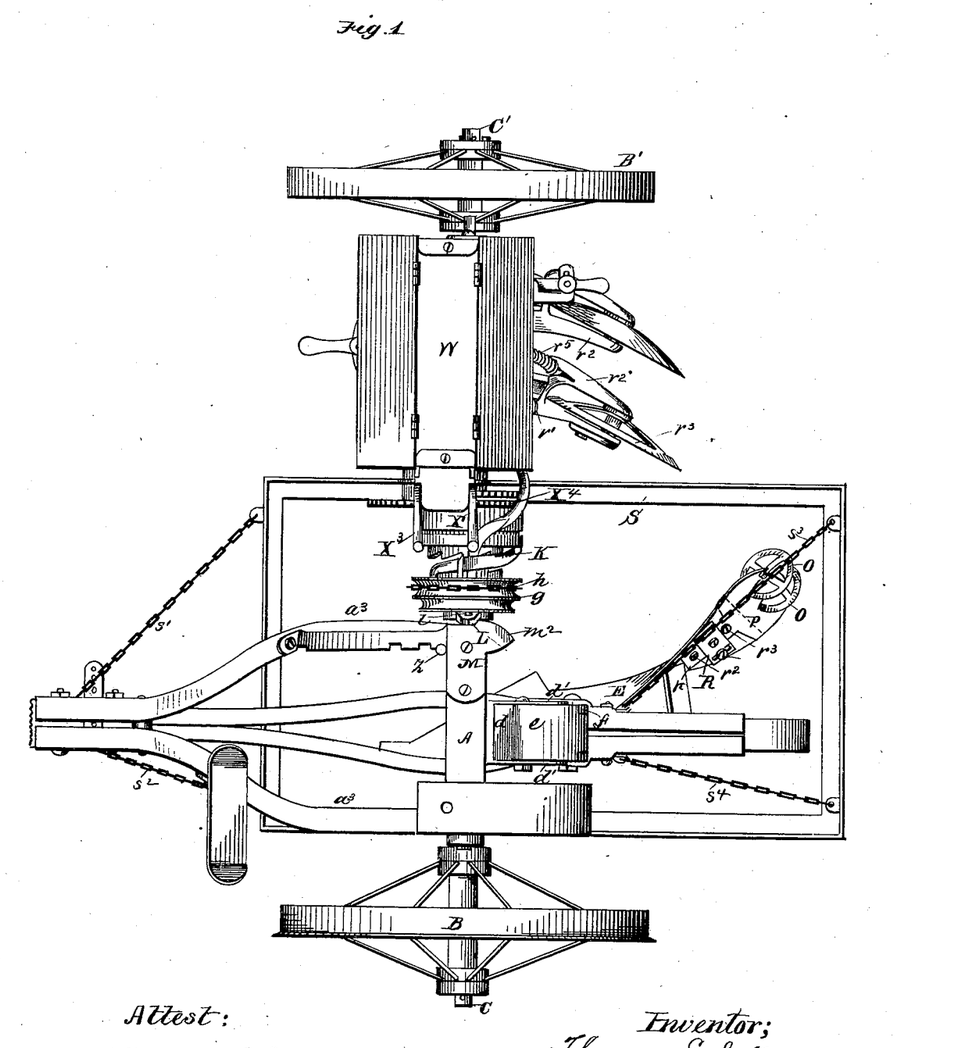
Figure 1 is a top-plan view of the machine.
Figure 2:
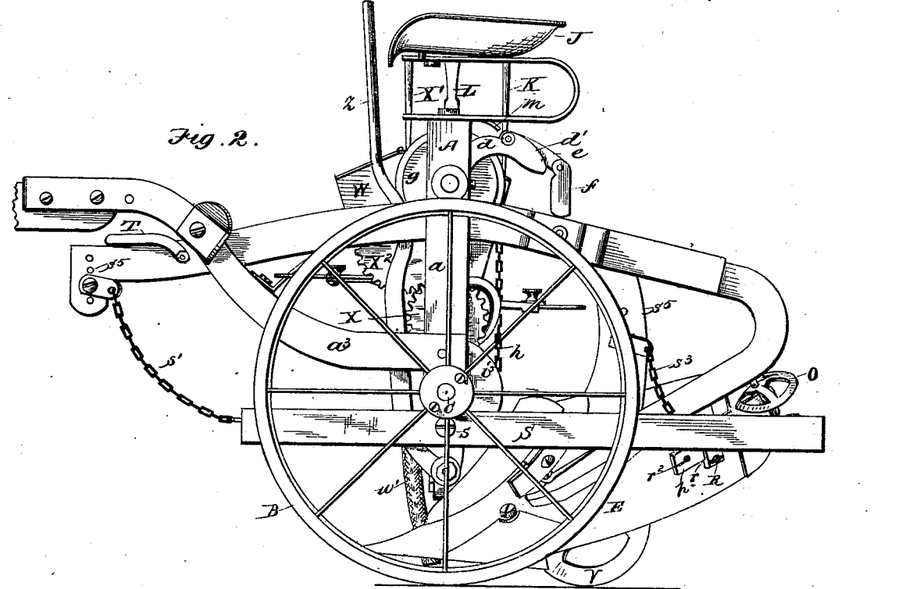
Figs. 2 and 3 are elevations of the same, looking from opposite sides.
Figure 3:
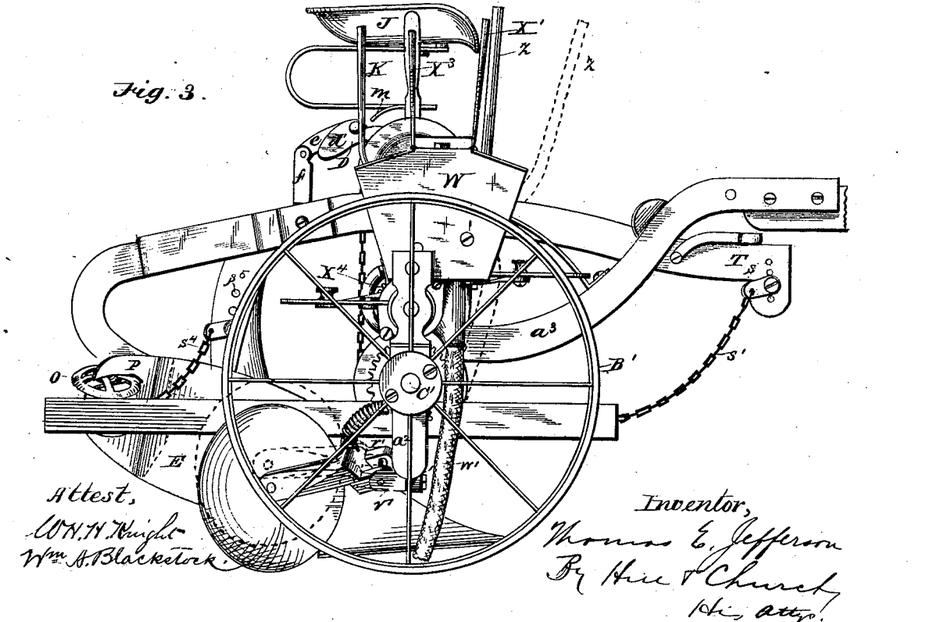
Figure 4:
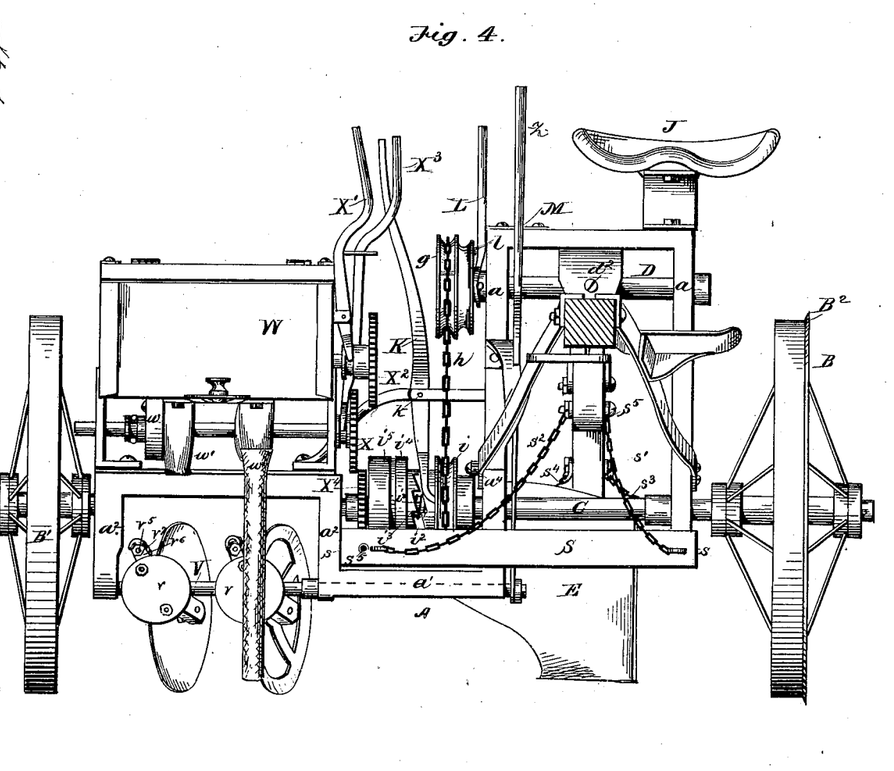
Fig. 4 is a front elevation.
Figure 5:
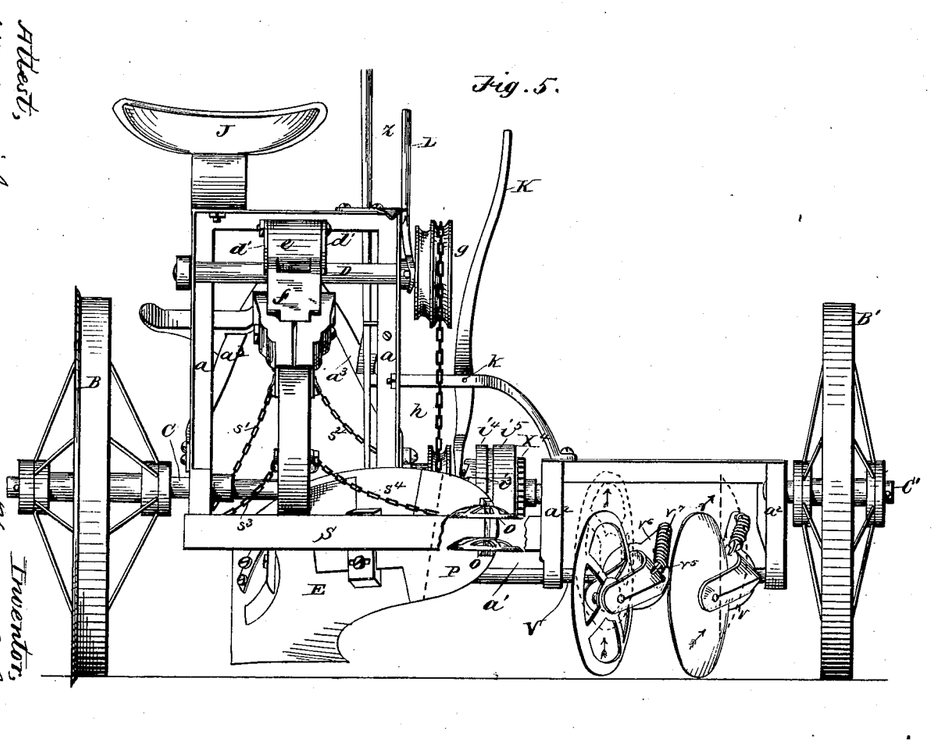
Fig. 5, a rear elevation.

To permit of the requisite lateral play of the plow upon its supports, the opening made in the suspending-arm $d$ for the accommodation of the shaft D is formed slightly larger than the diameter of said shaft, and said arm is secured in place by a bolt, $d^2$, passed through it and also through the shaft, as shown in Fig. 4. This construction enables the arm to rock slightly from side to side on its securing-bolt, and the plow to move to one side or the other to avoid a rock or other obstacle and return again to its normal position without changing the course of the machine.

The construction of the plow suspending and lifting devices $d\ e\ f$ is such that at the commencement of the lifting operation the vertical movement of the plow out of the soil is slow, but the leverage exerted great, while as the operation continues the movement is faster, but the leverage is decreased. This change in leverage and speed results from the gradual removal of the point of suspension farther from the fulcrum of axis of motion—i. e., the shaft D.

Figs. 7, 8, and 9 of the drawings show the improved colter. Its blade N, preferably of concavo-convex form, is journaled in the arms of a bar, $n$, and the said bar is jointed by a cross-bolt to a vertical staff or bar, $n'$, and connected to a horizontal bar, $n^2$, arranged on top of the plow-beam, and held by a bolt, $n^3$, passing through its rear end and through stationary metal straps, or their equivalents, $n^4\ n^4$, secured to the beam, as shown. A flat spring, $n^5$, is secured at one end to the vertical staff or bar $n'$, while its other end is connected to the upper end of the bar $n$ by means of a link, $n^6$. The bolt which connects the bar $n$ with the vertical bar $n'$ is screw-threaded, and has one nut working upon it between the arms of the bar $n$, and two other nuts working on its outer ends and against the outer sides of the arms of bar $n'$. The part of the bar $n'$ which passes through the plow-beam is made of cylindrical form, so as to be capable of turning in the beam. One or more nuts are provided on the cross-bolt $n^3$ on opposite sides of the end of the horizontal bar $n^2$, and one or more other nuts on the outer ends of said bolt are adapted to bear against the metal straps $n^4\ n^4$. The disk N normally stands obliquely to the line of draft, and acts not only to cut and open the soil, but also to turn it partially over, so as to carry the grass, &c., upon it underneath, the turning being completed by the action of the mold-board of the plow proper. If the disk meets with a stone or other obstruction, the spring $n^5$ will yield and permit it to ride safely over, bringing it back to normal position when the obstruction is passed. To vary the degree of obliquity of the disk to the line of draft it is only necessary to properly adjust the nuts on the bolt $n^3$, so as to cause the bar $n^2$ to swing to the right or left and turn the vertical bar $n'$, and with it the bar $n$, carrying the disk, as will be readily understood.

If it is desired at any time to change the position of the disk to keep its cutting part in line with the plow-point, it can be done by a proper manipulation of the nuts upon the bolt as will also be apparent. The connection of the link of the spring with the end of the inclined bar $n$ is such as to permit of the various adjustments of the bars without affecting the operation of such spring, and the form or kind of spring is not material, any spring which will accomplish the desired object being used. The several nuts may be used to secure the adjustment of the several bars on their bolts; but while this is a very simple and effective contrivance, any other suitable means of adjustment equally effective may be employed.

At the rear of the mold-board of the plow are arranged a series of loosely-revolving substantially horizontal concavo-convex or other shaped disks, O, having their bearings either in the mold-board itself or in a removable part, P, capable of attachment to the mold-board. Each of these revolving disks consists of a circular rim, a hub, and a number of radial arms connecting the rim to the hub. Open spaces are left between the arms to prevent the disks from choking or clogging up, and to render them self-cleaning and more effective pulverizers. The disks, when of concavo-convex form, may be arranged with either concave or convex side uppermost, as preferred. By this means the thorough pulverization of the soil is accomplished and the employment of a separate independent harrow rendered unnecessary.

When the part P is employed to support the disks it is preferably connected to the mold-board, so as to be capable of adjustment inward and outward and upward and downward, as well as backward and forward, and to this end it is provided with a shank, $p$, which passes through a loop, $r$, on a plate, R, and is secured by means of a screw-bolt, $r'$, passing through said loop and bearing against said shank, and two other screw-bolts, $r^2 r^3$, passing through the shank on either side of the loop and bearing against the rear face of the mold-board itself. The inner walls of the loop are made angular, as shown in Fig. 14, so as to permit the shank to be clamped in the desired position by the bolts $r^2 r^3$ to secure a forward or backward adjustment of the part P and the disks. The plate R is slotted at both ends, and is secured to the mold-board by bolts passing through said slots. The slots are of sufficient length to permit the plate to be turned to the right or left and be there secured by the bolts, and thus effect an adjustment of the part P and its disks up or down. The inward and outward adjustment can be effected by a proper manipulation of the several bolts $r' r^2 r^3$, as will be readily understood. All the various adjustments are necessary to meet the requirements of plowing in different kinds and conditions of soil, and are to be availed of as circumstances demand. The mold-board is tapered down to an edge at its rear end, so as to leave a smooth joint between it and the part P and prevent the catching and accumulation of earth at said joint.

Hung or suspended on the main frame at the points $s\ s$ is a pivoted frame, S, of rectangular or other suitable form, and diagonal chains $s'\ s^2$ extend from the front corners of said frame to the forward end of the plow-beam, while other diagonal chains, $s^3 s^4$, extend from the rear corners of the said frame to the standard $s^5$ of the plow, as shown. The draft is applied to the plow in a horizontal plane above the top of the beam and through a clevis, T, attached to the beam. This causes the chains $s'\ s^2$ to be drawn taut as the team advances. When the plow strikes an obstruction point-blank the tendency of the whole plow is, of course, to rise into the plane in which the draft is applied. In thus rising, however, the front chains, $s'\ s^2$, pull upward the forward end of the pivoted frame, thereby depressing the rear end of said beam and causing the rear chains, $s^3\ s^4$, to draw down, and thus raise the point of the plow, so as to enable it to clear the obstruction. In this manner I effect automatically the same result that is accomplished by the plowman when he bears down upon the handles of the ordinary plow in common use.

My improved mode of hanging the plow also enables it to swing slightly to either side, out of the line of draft, when it strikes an obstruction obliquely, and to return again automatically to its normal position when the obstruction is passed. To illustrate this, let it be supposed that the plow strikes an object so as to cause it to swing to the left, or toward the land side. This would cause the chains $s'$ and $s^3$ to slacken and the chains $s^2\ s^4$, on the opposite side, to be drawn taut, thus permitting the plow to go out of the line of draft around the object; but when the object was passed the tension on the chains $s^2\ s^4$ would pull the plow back into the line of draft again, as before. Should the plow be caused to swing toward the opposite or furrow side, the operation of the chains would be the same in effect, though reversed. This side movement of the plow can be regulated by changing the angle at which the chains are extended from the frame to the plow, and by means of adjustable fastenings $s^5\ s^6$ on the plow and frame, respectively. The plow can be hung by the chains to plow any depth required, and as the team is attached directly to the plow, the chains connecting the plow to the rocking or sulky frame permit the draft of the team to force the plow in the ground and to keep it at any desired depth, and allow of independent movement of both sulky and plow.

If desired, the plow can be connected to the rigid frame, as shown in Fig. 6, instead of to the rocking frame; but whether connected to the rocking frame or to the rigid frame, the effect of the mode of hanging it and the application of the draft to its beam is the same in both cases as regards the keeping of the plow at the proper depth. To enable this to be better understood, let it be supposed that the plow running at a predetermined depth meets with an obstruction which forces it above or below its normal working position. In such case the point at which the team is connected to the beam will be thrown above or below the horizontal plane of the draft, and the resistance offered by the weight of the main frame and parts connected to it, applied to the beam through the forward chains, will draw the plow down or up till the normal depth of plowing is reached and the point of connection of the team is again restored to the horizontal plane of draft.

Where there is no landside to the plow there is, of course, a side pressure upon the plow, and through the plow upon the sulky-frame, which must be counteracted in order to keep the machine properly in its course. The mere traction of plain supporting-wheels is insufficient for the purpose, and I therefore provide the wheel B on the revolving axle C with a peripheral flange, $B^2$, which, entering the soil, increases the traction and affords a resistance to the side pressure of the plow, at the same time increasing the lifting-power of the axle C. The side pressure upon the frame, it will be observed, is applied to the inner end of the axle C, near the middle of the frame, and is thence communicated through the axle to the wheel B. This mode of applying the side pressure is preferable to that of applying it directly upon the hub of the wheel B, as the end of the axle affords but a small bearing, being a mere pivot, and consequently reduces friction to a minimum.

V is a shaft mounted in the lower end of the extension $a^2 a^2$, and having secured to it one, two, or more heads, $v\ v$, each consisting of two plates, one in front and one in rear, and clamped tightly to the shaft by means of bolts or otherwise. Each of the rear plates has ears $v'\ v'$, between which is pivoted, upon a diagonal or horizontal bolt, an arm, $v^2$, carrying a concavo-convex disk, $v^3$. To the upper portion of each of the arms $v^2$ is attached a curved arm, $v^5$, which extends forward through a guide-loop, $v^6$, on the front plate of the head, and is surrounded by a spring, $v^7$, confined between a collar on the curved arm and the said loop $v^6$. The disks are set obliquely to the line of draft, and are held down by means of the springs $v^7$. They operate to harrow and pulverize the soil turned over by the plow, and by producing an opposing side pressure assist the flanged wheel B in counteracting the side pressure of the plow proper. Instead of the springs specified, any other device may be employed for permitting the disks to yield automatically when an obstruction is encountered, and to better adapt themselves to the unevenness of the soil. The opposing side resistance of the disks is substantially in line with the side pressure of the plow proper, and therefore directly counteracts the latter. When the arms which hold the disks are hinged to the heads upon diagonal axes, either disk meeting with an obstruction overcomes the tension of its depressing-spring and swings upward and into the line of draft, thus clearing the obstruction without injury. The disks may be made open or plain, as preferred, and any desired number of them may be employed. Other forms and kinds of supporting-arms and springs may be employed without departing from the principle of my invention in this regard, it only being necessary that the arms be arranged to swing upon oblique or horizontal axes, and that there be springs to keep them normally depressed.

A hand-lever, Z, connected to the shaft V and extending up within reach of the driver, affords means by which the said shaft can be rocked so as to raise or lower the harrow-disks, as desired.

In cases where the harrow-disks are dispensed with it may be found desirable to flange the wheel B' as well as the wheel B, to counteract the side pressure.

Mounted upon the top portion of the extension $a^2 a^2$ is a combined seed and fertilizer sower, preferably consisting of a hopper, W, divided by a central longitudinal partition into two compartments, each of which is provided with feeding devices for delivering the seed and fertilizer, either separately or together, into a common conductor, $w$, to be thence conducted by tubes $w'\ w'$ to the ground.

The shaft upon which the feeding devices of the seed-compartment are mounted is preferably grooved longitudinally in its projecting end, and carries a gear-wheel, X, provided with a feather or spline entering the groove, and adapted to be moved back and forth along the shaft by means of a shipping-lever, X', projecting within reach of the driver from his seat. Mounted upon the projecting end of the shaft of the fertilizer-feeder is another gear-wheel, $X^2$, having also a feather which enters a longitudinal groove in its shaft, after the manner of the wheel X, and adapted to be moved back and forth by means of a shipping-lever, $X^3$, also within reach of the driver. Wheel X is adapted to mesh with wheel $X^2$, and the latter, in turn, is adapted to mesh with and be driven by a gear-wheel, $X^4$, revolving with the fixed disk $i^5$ on the revolving axle C. By properly manipulating the levers X' $X^3$ the fertilizer-sowing devices and the seed-sowing devices can be both thrown into and out of operation by the driver, at will, without stopping the machine or even leaving his seat, or the fertilizer-sowing devices only can be thrown out, according as the necessity of the case requires.

The gear-wheel X⁴ is mounted loosely upon the hub of the fixed disk $i^5$ on the revolving axle C, and it has a segmental slot, $y'$, in its side, into which enters a pin or stud, $y^2$, projecting laterally from the said disk. A spring, $y^3$, connected at one end to the disk and at the other end to the gear-wheel, operates to turn the wheel, so that the pin $y^2$ shall normally stand at the rear end of the slot $y'$. This construction is for the purpose of preventing breakage or stripping of the teeth of the gears in throwing them into engagement when the machine is in operation. The lateral edges of the teeth of the gears are preferably beveled or rounded off, as shown in Fig. 15, to better insure their engagement.

Having thus described my invention, I claim as new and desire to secure by Letters Patent—

1. The main frame, constructed preferably of metal, having the extension $a\ a$ and the shorter extension $a^2\ a^2$, united to the first by the part $a'$, and having also the front projecting bar, to which the tongue of the machine is adapted to be attached, substantially as described.

2. The combination, with the main frame, of the rotary axle, having its bearings in the lower end of the extension $a\ a$ and in the inner part of the extension $a^2\ a^2$, the fixed axle, secured to the outer part of the extension $a^2\ a^2$, and the supporting-wheels, one secured to the rotating axle and the other mounted loosely upon the fixed axle, substantially as described.

3. The means for suspending the plow, consisting of the short curved arm adapted to be secured to the suspending-shaft, and having side flanges, the link articulated to the flanges of the said curved arm and adapted to work between the same, and one or more other links for forming the connection between the first link and the plow, substantially as described.

4. The combination of the suspending cross-shaft, the flanged curved arm secured thereto, the links forming the connection between the arm and the plow, with the plow and means for rotating the shaft, whereby, when the shaft is rotated, the point of suspension of the plow is gradually removed farther from the axis of the shaft, so as to cause the plow to be raised out of the soil slowly at first, but faster as the lifting operation proceeds, substantially as described.

5. The combination, with the suspending cross-shaft, of the curved arm, having an opening through it for the accommodation of the shaft larger than the diameter of the latter, and the bolt for holding the arm on the shaft, whereby the arm is allowed to tilt to permit the plow to swing laterally slightly in either direction, substantially as described.

6. The combination of the cross-shaft, the plow suspended therefrom by a flexible connection, with means for driving said shaft from the rotating axle, so as to raise the plow by the power of the team, substantially as described.

7. The combination of the cross-shaft, the plow-suspending devices, and the plow with the fixed pulley on the end of the cross-shaft, the loose pulley on the rotating axle, the endless chain, and means for throwing the loose pulley into and out of engagement at will with a clutch on the rotating axle, substantially as described.

8. The combination, with the pulley on the end of the plow-suspending shaft, of the lever L, having the laterally-projecting pin, the spring for bearing against said pin to force the lever outward, and the stationary shouldered locking-plate, with which said lever automatically engages when the plow is raised, substantially as described.

9. The combination, with the loose pulley on the revolving axle, of the stop on the frame, adapted to automatically engage with the stud on the pulley when the plow is lifted to its highest point, so as to throw the said pulley out of engagement with the clutch on the revolving axle, substantially as described.

10. The combination, with the fixed pulley on the suspending cross-shaft, and the loose pulley on the revolving axle, and their connecting-chain, of means, substantially as described, for automatically disengaging the loose pulley from the revolving clutch when the plow is elevated, and other means, substantially as described, for automatically locking the cross-shaft from backward rotation at the time when or immediately after such disengagement of the loose pulley takes place.

11. The combination, with the main frame and a plow flexibly suspended therefrom so as to be capable of vertical movement, of a rocking frame pivoted to or hung upon the main frame, and having chains or their equivalents extending to the standard of the plow and to the plow-beam, substantially as shown, whereby, when the plow meets an obstruction, its point is automatically caused to rise and its rear portion to descend so as to clear the same, substantially as described.

12. The combination, with the main frame and a plow suspended therefrom so as to be capable of a slight lateral movement, of a rocking frame pivoted to or hung upon the main frame, and having chains or their equivalents extending to the plow-standard and to the plow-beam, substantially as shown, whereby the plow is caused to automatically pass around an obstacle without throwing the main frame and wheels out of their course, and to be afterward brought back again into normal position, substantially as described.

13. The combination, with the main frame and a plow suspended therefrom so as to be capable of both a vertical and a lateral movement, of the rocking frame and the chains connecting it to the plow, substantially as described.

14. The main frame of the machine and the plow suspended therefrom, in combination with the revolving axle, arranged to receive the side draft or side thrust of the machine upon its inner end, at or near the center of the machine, substantially as described.

15. In a sulky-plow, the combination of a main frame, a plow suspended therefrom and adapted to be raised by power derived from the team, with one or more of the supporting-wheels, having a peripheral flange or flanges thereon, and adapted to resist the side pressure of the plow, and thus increase the traction or lifting-power of said wheels, substantially as described.

16. The combination, with a plow, of a colter consisting of a concavo-convex disk arranged on a substantially-horizontal axis obliquely to the line of draft, and adapted to automatically yield readily to rocks or other obstructions with which it comes in contact, substantially as described.

17. The combination of the concavo-convex blade of the colter with the inclined arm in which the blade is mounted, the vertical arm to which the inclined arm is articulated, the horizontal arm above the plow-beam, the stationary metal straps, and the nuts and bolts, or their equivalents, for adjusting the blade to the desired angle with respect to the line of draft, substantially as described.

18. The combination, with the plow, of one or more revolving disks arranged at the rear of the mold-board, and having openings through them to permit of the passage of the soil for the purpose of securing more thorough pulverization of the latter, and also to render said disks self-cleaning, substantially as described.

19. The combination, substantially as described, of the mold-board of the plow, the plate R, having the loop or socket, and the part P, carrying the disk or disks, and rendered adjustable in and out and forward and backward by means of the adjusting-bolts, substantially as described.

20. The plate R, having the loop or socket, and having segmental slots and bolts, whereby to adjust it so as to cause the part P and its disks to be moved up or down, substantially as described.

21. The combination, with a main frame and a plow suspended therefrom, of a series of oblique rotary disks, placed directly opposite the mold-board and upon the plowed furrows, for dividing and harrowing the turned soil, and for the further purpose of resisting the tendency of the side thrust of the plow to twist around the frame and tongue and exert a side pressure upon the team, substantially as described.

22. The combination, with the main frame, the plow suspended therefrom, and the supporting-wheels, one of which has a peripheral flange, of a series of obliquely-positioned rotary disks arranged abreast the plow, and operating in connection with the flanged wheel to oppose in direct line the side pressure of the plow, substantially as described.

23. The oblique harrowing-disks mounted in arms which are hung upon diagonal axes, substantially as described.

24. The oblique harrowing-disks mounted in arms hung upon diagonal axes and kept down to their work by means of springs, or their equivalents, substantially as described.

25. The combination of the heads V V, clamped to their shaft, and having ears $v'$ $v'$ and guide-loops $v^6$, with the arms $v^2$, curved arm $v^5$, and springs $v^7$, substantially as described.

26. In a sulky-plow, the combination, with the series of obliquely-arranged harrowing-disks, of the rock-shaft, mounted in the extension of the main frame, and upon which the supports of said disks are mounted, and the hand-lever projecting within reach of the driver from his seat, whereby the said series of disks are adapted to be raised or lowered at will, substantially as described.

27. The combination, with the main frame and its supporting-wheels, of the suspended plow, having the harrowing-disks O at the rear of its mold-board for harrowing the soil as it is being turned to prepare it for the reception of the seed, the seed and fertilizer sowing devices, mounted upon the frame between the plow and the supporting-wheel on the furrow side, and deriving motion from the rotating axle, and the series of oblique harrowing-disks for further harrowing the soil and covering the seed, all arranged and operated substantially as described.

28. The combination, with the main frame of the machine, the plow, and the oblique harrowing-disks, of seed and fertilizer sowing mechanisms arranged upon the main frame, and the levers $x'$ $x^3$, under the control of the driver from his seat, for throwing into or out of operation at will either or both of said mechanisms, substantially as described.

29. In a wheeled plow, the combination of a main frame and supporting-wheels, a plow suspended from the main frame by a flexible connection, and chains or their equivalent for connecting the beam of the plow, directly or indirectly, to said main frame, as described, whereby, by the application of the draft to the plow-beam, the proper position of the plow in the ground is automatically preserved, substantially as described.

30. The gear-wheel $x^4$, mounted loosely upon the hub of the fixed disk $i^5$, and having a segmental slot, in combination with the lateral pin or stud on the said disk, and the spring $y^3$, for the purpose of preventing breakage of the teeth of the gears when thrown into engagement while the machine is running, substantially as described.

THOS. E. JEFFERSON.

Witnesses:
WM. A. BLACKSTOCK,
MELVILLE CHURCH.